United States Patent
Hirohata et al.

(10) Patent No.: US 6,689,295 B2
(45) Date of Patent: Feb. 10, 2004

(54) CARBONACEOUS POROUS BODY AND METHOD FOR PRODUCING THE SAME

(75) Inventors: Takeshi Hirohata, Kawachinagano (JP); Shinya Kawakami, Hannan (JP)

(73) Assignees: Osaka Prefectural Government, Osaka (JP); E. Tec Co., Ltd., Osaka (JP)

( * ) Notice: Subject to any disclaimer, the term of this patent is extended or adjusted under 35 U.S.C. 154(b) by 15 days.

(21) Appl. No.: 09/813,125

(22) Filed: Mar. 21, 2001

(65) Prior Publication Data

US 2002/0038864 A1 Apr. 4, 2002

(30) Foreign Application Priority Data

Mar. 23, 2000 (JP) ......................... 2000-128587

(51) Int. Cl.$^7$ .................. C01B 31/00; C01B 31/04; C08L 101/00; H01B 1/00
(52) U.S. Cl. .................. 252/500; 252/500; 252/502; 252/62.2; 264/126; 264/29.1; 264/29.5; 264/29.6; 264/101; 264/105; 208/22; 208/39; 208/44; 423/445 R; 423/447.4; 429/245; 521/180
(58) Field of Search ................. 252/500, 502, 252/62.2; 264/105, 29.1, 29.5, 29.6, 101, 126; 429/245; 521/180; 208/22, 39, 44; 423/445 R, 447.4; 428/312.2, 304.4

(56) References Cited

U.S. PATENT DOCUMENTS

| | | | |
|---|---|---|---|
| 5,487,946 A | | 1/1996 | McGinniss et al. |
| 5,500,450 A | | 3/1996 | Simandl et al. |
| 5,529,971 A | | 6/1996 | Kaschmitter et al. |
| 5,540,996 A | | 7/1996 | Tanzilli et al. |
| 5,571,848 A | | 11/1996 | Mortensen et al. |
| 5,626,977 A | * | 5/1997 | Mayer et al. ............ 252/502 |
| 5,744,510 A | | 4/1998 | Pekala |
| 5,770,127 A | | 6/1998 | Abrams et al. |
| 5,776,372 A | | 7/1998 | Saito et al. |
| 5,789,338 A | | 8/1998 | Kaschmitter et al. |
| 5,827,355 A | * | 10/1998 | Wilson et al. .............. 55/527 |
| 5,868,974 A | | 2/1999 | Kearns |
| 5,932,185 A | | 8/1999 | Pekala et al. |
| 5,945,084 A | | 8/1999 | Droege |
| 5,961,814 A | | 10/1999 | Kearns |
| 5,972,538 A | * | 10/1999 | Saito et al. .............. 429/245 |
| 6,024,900 A | * | 2/2000 | Saito et al. .............. 264/105 |
| 6,033,506 A | | 3/2000 | Klett |
| 6,054,801 A | | 4/2000 | Hunt et al. |
| 6,077,464 A | | 6/2000 | Murdie et al. |
| 6,103,149 A | | 8/2000 | Stankiewicz |
| 6,183,854 B1 | | 2/2001 | Stiller et al. |
| 6,241,957 B1 | | 6/2001 | Stiller et al. |

FOREIGN PATENT DOCUMENTS

| | | | |
|---|---|---|---|
| JP | 07-033551 | | 2/1995 |
| JP | 10-245491 | * | 9/1998 ......... C08L/101/00 |
| JP | 3054757 | | 4/2000 |

* cited by examiner

*Primary Examiner*—Mark Kopec
*Assistant Examiner*—Kallambella Vijayakumar
(74) *Attorney, Agent, or Firm*—Armstrong, Kratz, Quintos, Hanson & Brooks, LLP

(57) ABSTRACT

The present invention provides a method of manufacturing an exfoliated graphite/phenol resin composite foam of a porosity of 50–95%, a density of 0.1–0.8 g/cm$^3$, by forming under contact pressure or reduced pressure at a temperature of 140–200° C. a mixture comprising 100 parts by weight of powdered and/or crushed exfoliated graphite and 40–240 parts by weight of phenol resin; an exfoliated graphite/phenol resin composite foam obtained by the method; and a method of obtaining an exfoliated graphite/glassy carbon composite foam of a porosity of 50–95%, a density 0.1–0.8 g/cm$^3$ with volumetric baking shrinkage of 10% or less by baking the exfoliated graphite/phenol resin composite foam.

11 Claims, No Drawings

CARBONACEOUS POROUS BODY AND METHOD FOR PRODUCING THE SAME

FIELD OF THE INVENTION

The present invention relates to a light porous carbon material having exfoliated or expanded graphite as a principal component, and to a method of manufacture thereof.

BACKGROUND OF THE INVENTION

Usually, non-woven fabrics, felt and the like materials composed mainly of highly porous carbon fiber are used for heat insulation at ultrahigh temperatures of 2000° C. or higher. These heat-insulating materials are highly porous, but because they have no closed pores or cells they are permeable to radiant heat and cannot exhibit the superior heat insulating characteristics that are expected for the high porosities.

Japanese Unexamined Patent Publication No. 33551/1995 discloses a method of manufacturing a porous graphite or carbon material for use as a heat insulator for vacuum furnaces. The method comprises the steps of foaming phenol resin with foaming agent and foam-stabilizing agent, and baking the resulting foam at 2000° C. or more in an inert gas atmosphere. However, the porous material produced by this method is very non-uniform in pore diameter, and since the carbonization yield after heat-treatment is about 70%, and the carbonization shrinkage rate may reach about 20% in one direction and the volumetric shrinkage can be as much as about 50%, it has very poor dimensional stability. Moreover, when heat-treating a foamed article with large volume, it is necessary to heat it carefully over a long period of time, taking care not to cause cracking in the article, and the resulting high-cost product is not suited for practical use. In addition, the porous material obtained after heating or baking is hard and fragile, with low resistance to mechanical shock. These defects may be attributable to glassy carbon which forms on graphitization of phenol resin in the foam baking step because it is a dense and hard carbon material, and it is therefore difficult to graphitize even when heat-treated at a temperature of 2000° C. or higher in a subsequent processing.

SUMMARY OF THE INVENTION

Therefore, it is a principal object of the present invention to provide a foamed carbon material excellent in high-temperature insulation and thermal shock-resistance, and a method of manufacturing such a foamed carbon material.

The inventors have found that when a mixture of phenol resin and powdered and/or crushed exfoliated or expanded graphite is used as the starting material for manufacturing a foamed carbon product, the following phenomena occur:

(1) By suitably selecting a range of grain size for the powdered and/or crushed exfoliated or expanded graphite (referred to hereinafter as "exfoliated graphite powder" except when necessary) and a ratio of exfoliated graphite powder and phenol resin in the mixture, it is possible to control the pore diameter and porosity in a resin foam formed by heating the mixture;

(2) Since phenol resin foams easily when heated, the foaming volume of the resin foam that is the intermediate product can easily be controlled through the heating temperature;

(3) Baking time can be reduced when the resulting resin foam is subjected to heating at 2000° C. or more to produce a carbon foam or foamed carbon body;

(4) When the pore diameter and porosity of the resin foam are controlled, it is dimensionally stable during the baking step and shows little shrinkage. Thus, by controlling the parameters in (1) above the pore diameter and porosity in the carbon foam as the final product can be controlled as required.

More specifically, according to the present invention, the pore diameter in the carbon foam can be controlled with use of the exfoliated graphite powder having adjusted particle size by sieving. Thus, with the proportion of exfoliated graphite powder in the starting mixture fixed, the resin foam that is the intermediate product will have a smaller pore size if the exfoliated graphite powder grains are small in diameter, making it less porous and therefore denser. Conversely, if the exfoliated graphite powder grains are large in diameter, the resin foam will have larger pore sizes, making it more porous and consequently less dense.

Alternatively, with the grain diameter of the exfoliated graphite powder in the starting blend fixed, a greater ratio of exfoliated graphite powder will result in the intermediate resin foam and the final carbon foam which are more porous and less dense. Conversely, a smaller proportion of exfoliated graphite powder will result in less porous and denser resin foam and carbon foam.

Furthermore, the controlled porosity and density described above for the resin foam can be reproduced in much the same degree in the carbon foam.

The present invention was achieved based on the new findings described above and provides the following resin foam, carbon foam and methods of manufacture thereof.

1. An exfoliated graphite/phenol resin composite foam with a porosity of 50–95% and a density of 0.1–0.8 g/cm$^3$, formed by molding a mixture of 100 parts by weight of powdered and/or crushed exfoliated graphite with a grain diameter of 5–3000 µm and 40–240 parts by weight of phenol resin under contact pressure or reduced pressure at a temperature of 140–200° C.

2. A method of manufacturing an exfoliated graphite/phenol resin composite foam with a porosity of 50–95% and a density of 0.1–0.8 g/cm$^3$, the method comprising molding a composition of 100 parts by weight of powdered and/or crushed exfoliated graphite with a grain diameter of 5–3000 µm and 40–240 parts by weight of phenol resin under contact pressure or reduced pressure at a temperature of 140–200° C.

3. An exfoliated graphite/glassy carbon composite foam, the composite foam being obtainable by baking the exfoliated graphite/phenol resin composite foam described in item 1 above in a non-oxidizing atmosphere at a temperature of 600–2000° C., and having a volumetric shrinkage of 10% or less.

DETAILED DESCRIPTION OF THE INVENTION

The phenol resin used in the invention is not limited to the narrowly-defined phenol resin obtained by the reaction of phenol and formaldehyde, but encompasses a broader range of phenol resins designated by such terms as cresol resin, alkylphenol resin, etc., corresponding to respective starting materials. In more detail, the nucleus of the resin structure can be formed from a wide range of phenols including not only phenol but also o-cresol, p-cresol, m-cresol, resorcinol, 1,3,5-trimethylphenol, o-xylene, p-xylene, m-xylene, phenylphenol, etc. Likewise, besides formaldehyde, benzaldehyde, terephthalaldehyde, paraxylene glycol, etc. can be used to bridge the phenols.

Although usable phenols are not limited, preferable are those having a carbonization yield of 50wt. % or more, more preferable are those having a carbonization yield of 70 wt. % or more when such a phenol resin is heated to 1000° C. under a non-oxidizing atmosphere. Using a phenol resin with a higher carbonization yield results in stronger bonds between the exfoliated graphite powder grains.

Other resins with high carbonization yields such as furan resins and polyimide resins can be used, as well as pitch and tar, but phenol resins are more desirable from the standpoint of lower cost and ease of handling.

The phenol resin used may be in liquid, powdered or solid form, but from the standpoint of productivity (ease of handling, production speed, process simplification, etc.) the powdered form is most preferable. Also, when considering the quality stability and reproducibility of the exfoliated graphite/phenol resin composite foam and exfoliated graphite/glassy carbon composite foam, the particle diameter of the phenol resin powder is preferably the same as or close to that of the exfoliated graphite powder as described below.

The properties of the powdered or crushed exfoliated graphite (referred to hereinafter simply as "exfoliated graphite powder") used in the present invention are not limited. The exfoliated graphite powder is usually about 5–3000 $\mu$m (preferably 50–3000 $\mu$m, and more preferably 100–1000 $\mu$m) in particle diameter and 0.004–0.2 g/cm$^3$ (preferably 0.05–0.1 g/cm$^3$) in bulk density. By regulating the grain size of the exfoliated graphite powder in advance, the pore sizes can be controlled both in the exfoliated graphite/phenol resin composite foam as the intermediate product and in the exfoliated graphite/glassy carbon composite foam as the final product. The grain size of exfoliated graphite powder can be adjusted, when required, in conventional manners as by crushing the exfoliated graphite material and sieving the crushed material.

In the present invention, an exfoliated graphite/phenol resin composite foam (hereinafter simply referred to as "composite foam" except when necessary) is first manufactured by mixing 40–240 parts by weight of phenol resin with 100 parts by weight of exfoliated graphite powder and forming the resultant mixture. The smaller is the proportion of phenol resin in the mixture, the higher will be the porosity of the composite foam, and the composite foam will show greater heat insulation but lower mechanical strengths. By contrast, increasing the proportion of phenol resin improves strengths but impairs the heat-insulating property of the composite foam. Also, a higher proportion of phenol resin increases production costs because it necessitates to slowly heat the composite foam over a long period of time to prevent cracks from forming during the baking process. Moreover, since the resulting baked foam (described below) tends to have greater carbonization shrinkage, it is dimensionally less stable.

Consequently, the mixing ratio of phenol resin to exfoliated graphite powder can be suitably selected within the above-stated range in order to achieve a porosity of 50–95% (more preferably 50–85%) for the composite foam, depending on the intended use of the exfoliated graphite/glassy carbon composite foam which is the final product.

Foaming and molding of the starting mixture is conducted by placing the mixture in a metal mold or the like, maintaining the curing temperature of the mixture in the range of 140–2000° C. (preferably in the range of 150–170° C.) under contact pressure or reduced pressure. For example, when a fixed quantity of starting mixture is foamed in a mold equipped with a movable top press, the volume and porosity of foamed product can be regulated by moving the top press up or down.

The density of the composite foam can be controlled not only through the curing temperature but also through the molding pressure. Although it would not be commercially preferable, for example, a composite foam with a maximum bulk density of up to 1.5 could be obtained by molding under increased pressures, while a composite foam with a minimum bulk density of about 0.05 g/cm$^3$ could be produced by elevating the curing temperature under reduced pressures. The composite foam according to the present invention preferably has a bulk density of about 0.1–0.8 g/cm$^3$. When the composite foam is used as it is for heat insulation, a bulk density of about 0.2–0.5 g/cm$^3$ is more desirable from the viewpoint of balancing the heat insulation, strengths and like properties.

The exfoliated graphite/glassy carbon composite of the present invention is obtained by heating the composite foam obtained as described above in a non-oxidizing atmosphere at a temperature of 600–2000° C. (preferably about 800–1500° C.).

The volumetric shrinkage of the exfoliated graphite/glassy carbon composite of the invention is at most 10% on the basis of the precursor composite foam, and it could be 0.8% or less under optimal conditions. When the volumetric shrinkage is 1% or less, the porosity and bulk density of the exfoliated graphite/glassy carbon composite of the present invention will be substantially the same as those of the precursor composite foam.

In the exfoliated graphite/glassy carbon composite of the present invention, the "glassy carbon part" has the following characteristics. (1) In terms of both structure and material properties, it is highly isotropic; (2) compared to the graphite part, it is extremely hard, and its fractures are conchoidal and similar to glass fractures; (3) its permeability to gas is extremely low.

It is not fully clarified as yet why the exfoliated graphite/glassy carbon composite of the invention can produce the remarkable effects shown below, but it is presumed that the presence of the aforementioned glassy carbon part contributes greatly to its highly improved properties.

EFFECTS OF THE INVENTION

According to the present invention, it is possible to control the pore diameter and porosity in the exfoliated graphite/glassy carbon composite as the final product, by adjusting, for example, by sieving or the like, the size of the powder grains which are the smallest component units of the exfoliated graphite as a raw material.

Moreover, while the carbonization shrinkage (uniaxial shrinkage) of conventional carbon foams may be as high as 20%, the volumetric carbonization shrinkage (triaxial shrinkage) of the exfoliated graphite/glassy carbon composite of the invention is usually less than 10%, and under optimal conditions may be as low as 0.8%. Consequently, the exfoliated graphite/glassy carbon composite of the invention is excellent in dimensional stability.

Compared with conventional carbon foam materials, the exfoliated graphite/glassy carbon composite of the present invention is light and highly porous, and since its thermal conductivity is very low, it has superior thermal insulating properties even at high temperatures of 2000° C. or above.

In addition, the exfoliated graphite/glassy carbon composite of the invention is chemically very stable and mechanically very strong at elevated temperatures, and has superior electromagnetic shielding properties.

EXAMPLES

The features of the present invention will be explained in more detail below with reference to examples.

Example 1

40 parts by weight of novolak-type phenol resin were added to 100 parts by weight of exfoliated graphite powder having an average particle size range of 1260–3000 μm adjusted by sieving, and mixed thoroughly. Next, 300 g of the mixture obtained as above was placed in a metal mold having internal dimensions of 10 cm×10 cm×10 cm and preheated to 160° C., and the mold was left for 15 minutes at 160° C. under a reduced pressure (about 1 Torr) in a vacuum compression molding machine to form the mixture.

After completion of molding, the formed product was removed from the mold. The formed product was a 10 cm×10 cm×10 cm block of exfoliated graphite/phenol resin foam with a porosity of 91.1% and a bulk density of 0.21 g/cm$^3$.

The exfoliated graphite/phenol resin foam obtained above was heated from room temperature to 1000° C. over 24 hours in an argon atmosphere. The volumetric shrinkage of the foam in the baking process was only 0.8%. After placing the resulting baked material (exfoliated graphite/glassy carbon composite foam) at a position 2 cm from a carbon heater (3 cm in diameter) in an ultrahigh temperature electric furnace with the internal atmosphere replaced beforehand with argon, the heater was turned on, and the surface temperature of the side of the baked material facing the carbon heater (front side temperature) and the surface temperature of the rear side (rear side temperature) were measured with a radiation thermometer when the surface temperature of the heater reached 2500° C.

The properties of the exfoliated graphite/glassy carbon composite foams obtained in Examples 1–4 and Comparative Example 1 are summarized in Table 1 below.

Example 2

An exfoliated graphite/glassy carbon composite foam of the invention was produced following the procedures in Example 1 above except that exfoliated graphite powder having an average grain diameter of 250–420 μm was used. The properties of the product were measured as in Example 1.

Example 3

An exfoliated graphite/glassy carbon composite foam of the invention was obtained following the procedures in Example 1 except that exfoliated graphite powder having an average grain diameter of 54–250 μm was used. The properties of the product were measured as in Example 1.

Example 4

An exfoliated graphite/glassy carbon composite foam of the present invention was obtained following the procedures in Example 1, except that 200 g of a mixture obtained by adding 240 parts by weight of novolak-type phenol resin to 100 parts by weight of exfoliated graphite powder was molded in a metal mold. The properties of the product were measured as in Example 1.

Example 5

A cylindrical indentation of 5 cm in diameter and 3 cm in depth was formed inside a 10 cm×10 cm×10 cm block of foam obtained in the same manner as in Example 1, and an excess of molten copper at about 1250° C. was poured into the cylindrical indentation. No change was found in the shape of the whole foam including the upper and outer surfaces of the block contacted by the overflowing molten copper, as well as the inside of the indentation of the block.

Comparative Example 1

A 10 cm×10 cm×10 cm cube was cut from a commercial graphite block, and the properties thereof were measured as in Example 1.

TABLE 1

| | Density (g/cm$^3$) | Porosity (%) | Thermal Conductivity (Kcal/K · h · m) | Temperature (° C.) | | |
|---|---|---|---|---|---|---|
| | | | | Front side | Rear side | Difference |
| Ex. 1 | 0.21 | 91.1 | 0.198 | 2470 | 2110 | 360 |
| Ex. 2 | 0.30 | 86.8 | 0.301 | 2472 | 2208 | 264 |
| Ex. 3 | 0.35 | 84.6 | 0.352 | 2468 | 2270 | 198 |
| Ex. 4 | 0.38 | 83.2 | 0.381 | 2471 | 2320 | 151 |
| Com. Ex. 1 | 1.87 | 17.5 | 90 | 2470 | 2450 | 20 |

Comparative Example 2

A 10 cm×10 cm×10 cm cube was cut from a commercial graphite block, a cylindrical indentation 5 cm in diameter by 3 cm in depth was formed therein, and an excess of molten copper at about 1250° C. was poured into the cylindrical indentation, upon which large cracks formed in the whole block.

Example 6

The electromagnetic shielding properties were measured by the KEC method using an exfoliated graphite/glassy carbon composite foam (30 cm×30 cm×2 cm) obtained in a similar manner as in Example 1. The magnetic field shielding properties and electrical field shielding properties are shown in Tables 2 and 3, respectively.

TABLE 2

| Frequency | Measurement Limit (dB) | Measurement (dB) |
|---|---|---|
| 1.000 (MHz) | −40.00 | −37.47 |
| 2.990 (MHz) | −53.00 | −51.53 |
| 9.967 (MHz) | −64.03 | −64.03 |
| 30.100 (MHz) | −71.78 | −71.78 |
| 100.329 (MHz) | −84.50 | −84.50 |
| 300.015 (MHz) | −86.69 | −86.69 |
| 1.000000 (GHz) | −68.50 | −68.50 |

TABLE 3

| Frequency | Measurement Limit (dB) | Measurement (dB) |
|---|---|---|
| 1.000 (MHz) | −40.00 | −40.00 |
| 2.990 (MHz) | −49.75 | −49.75 |
| 9.967 (MHz) | −59.38 | −59.38 |
| 30.100 (MHz) | −71.78 | −71.78 |
| 100.329 (MHz) | −79.72 | −79.72 |
| 300.015 (MHz) | −90.53 | −90.53 |
| 1.000000 (GHz) | −93.72 | −93.72 |

It is clear from the results shown in Tables 2 and 3 that the exfoliated graphite/glassy carbon composite foam of the present invention exhibits excellent properties exceeding the measurement limits of the measuring device both in terms of magnetic shielding and electrical shielding.

What is claimed is:

1. An exfoliated graphite/phenol resin composite foam having a porosity of 50–95% and a bulk density of 0.1–0.8 g/cm³, formed by molding at a temperature of 140–200° C. under contact pressure or reduced pressure a mixture comprising 100 parts by weight of graphite selected from the group consisting of powdered exfoliated graphite, crushed exfoliated graphite and mixtures thereof, the graphite of 5–3000 ; μm in particle size and 0.004–0.2 g/cm³ in bulk density, and 40–240 parts by weight of phenol resin.

2. The exfoliated graphite/phenol resin composite foam as claimed in claim 1, wherein the particle size of the graphite is in the range of 50–3000 μm.

3. The exfoliated graphite/phenol resin composite foam as claimed in claim 1, wherein the particle size of the graphite is in the range of 100–1000 μm.

4. The exfoliated graphite/phenol resin composite foam as claimed in claim 1, wherein the bulk density of the graphite is in the range of 0.05–0.2 g/cm³.

5. The exfoliated graphite/phenol resin composite foam as claimed in claim 1, wherein the molding temperature is in the range of 150–170° C.

6. The exfoliated graphite/phenol resin composite foam as claimed in claim 1, wherein the porosity is in the range of 50–85%.

7. The exfoliated graphite/phenol resin composite foam as claimed in claim 1, wherein the bulk density is in the range of 0.2–0.5 g/cm³.

8. A method of manufacturing an exfoliated graphite/phenol resin composite foam having a porosity of 50–95% and a bulk density of 0.1–0.8 g/cm³, the method comprising molding at a temperature of 140–200° C. under contact pressure or reduced pressure a mixture of 100 parts by weight of graphite selected from the group consisting of powdered exfoliated graphite, crushed exfoliated graphite and mixtures thereof, the graphite of 5–3000 μm in particle size and 0.004–0.2 g/cm3 in bulk density and 40–240 parts by weight of phenol resin.

9. An exfoliated graphite/glassy carbon composite foam, wherein the porosity is 50–95%, the density is 0.1–0.8 g/cm³, and the volumetric shrinkage caused by baking is 10% or less.

10. A method of manufacturing an exfoliated graphite/glassy carbon composite foam having a porosity of 50–95%, a density of 0.1–0.8 g/cm³ with volumetric shrinkage caused by baking of 10% or less, the method comprising heat-treating the exfoliated graphite/phenol resin composite foam as claimed in claim 1 under a non-oxidizing atmosphere at a temperature of 600–2000° C.

11. The method of manufacturing the exfoliated graphite/glassy carbon composite foam as claimed in claim 10, wherein the heat-treating temperature is in the range of 800–1500° C.

* * * * *